United States Patent [19]

Pikus

[11] Patent Number: 5,440,005
[45] Date of Patent: Aug. 8, 1995

[54] PROCESS AND APPARATUS FOR SOLID PHASE POLYMERIZATION OF POLYMERS

[75] Inventor: Ilya Pikus, Plymouth, Minn.

[73] Assignee: Hosokawa Bepex Corporation, Minneapolis, Minn.

[21] Appl. No.: 272,027

[22] Filed: Jul. 8, 1994

[51] Int. Cl.⁶ .............................................. C08G 63/00
[52] U.S. Cl. .................. 528/308.2; 528/272; 528/309.1
[58] Field of Search ............... 528/272, 309.1, 308.2

[56] References Cited

U.S. PATENT DOCUMENTS 4,161,578  7/1979  Herron ........................ 528/272

Primary Examiner—John Kight, III
Assistant Examiner—Terressa M. Mosley
Attorney, Agent, or Firm—Rockey, Rifkin & Ryther; James P. Ryther

[57] ABSTRACT

A process and apparatus for the solid phase polymerization of polymers wherein cold amorphous polymer is introduced to a crystallizer. Hot heat transfer liquid is employed in the crystallizer for heating the polymer through indirect heat exchange to crystallize the polymer. The crystallized polymer is discharged to a reactor for solid phase polymerization, and then passed from the reactor to a cooler. Cold heat transfer liquid is employed in the cooler to cool the polymer through indirect heat exchange. A forced recirculation closed-loop system for the heat-transfer liquid is provided between the crystallizer and the cooler whereby the heat recovery process is achieved.

10 Claims, 2 Drawing Sheets

PROCESS AND APPARATUS FOR SOLID PHASE POLYMERIZATION OF POLYMERS

BACKGROUND OF THE INVENTION

This invention relates to polymer processing systems. In particular, the invention is concerned with those systems which treat amorphous polyester to achieve crystallization followed by solid phase polymerization, followed by cooling. An example of such a system is found in Herron U.S. Pat. No. 4,161,578.

In systems of the type contemplated by this invention, cold amorphous polymer material is fed to a crystallizer and, after substantial heat input, hot product is discharged. The particular apparatus for achieving the crystallization may comprise an indirect heat supply unit or a fluid bed. The SOLIDAIRE ® or TORUSDISC ® equipment manufactured by Hosokawa Bepex Corporation of Minneapolis, Minn. is an example of an indirect heat supply unit which may be utilized for achieving the crystallization. In such a system, steam or other heated fluid is passed through rotors and/or jackets being in contact with the agitated polymer material. The polymer is thereby brought into contact with these hot surfaces and heated to the necessary temperature for achieving the crystallization reaction.

In a fluid bed system, for example units manufactured by Hosokawa Bepex, heated air is brought into contact with the polymer material. In order to improve heat transfer and to achieve the temperatures required for the crystallization reaction, it is preferred that indirect heating elements in the form of tube bundles or plate coils be immersed in the fluidized material.

In systems of the type described, the crystallized material is transferred to a reactor for achieving polymerization. Subsequent to the polymerization, the material is transferred to a cooler which may also comprise, for example, a TORUSDISC ® or fluid bed system. In this stage of the operation, the rotors, jackets or coils are supplied with cold heat transfer liquid to achieve the heat exchange necessary for cooling the product prior to discharge from the cooler.

In a typical operation of the type described, the steam or other heat transfer media employed for the crystallization stage is condensed and directed out of the system, for example, for use in a steam generator. Similarly, any heat values picked up by the liquids used during the cooling operation may be lost, or at least recovered only outside of the polymer processing system.

SUMMARY OF THE INVENTION

This invention provides a system for polymer processing wherein greatly improved efficiencies are achieved in the operation of the crystallization, polymerization and cooling cycle. In particular, the system constitutes a process and apparatus for heat recovery which substantially reduces the required capacity of heat supply units such as boilers or oil heaters and the capacity of cooling/refrigeration units such as water cooling towers.

The advantages of this invention are achieved in a system wherein a closed loop for the heat transfer liquid is employed in conjunction with the achieving of the crystallization, polymerization and cooling operations. Specifically, hot heat transfer liquid is delivered to a crystallizer unit employing indirect heat transfer. In this unit, amorphous polymer material is heated to temperatures in the order of 360° F. for crystallization. The material is then further heated to temperatures in the order of 420°–450° F. and delivered to a reactor to achieve polymerization. Finally, the material is delivered to a cooler which is also based on an indirect heat exchange concept.

In accordance with this invention, the same heat transfer liquid which is utilized for achieving the crystallization is delivered directly to the cooler. Thus, this heat transfer liquid will have encountered substantial heat loss in the course of the polymer chip crystallization process and will now serve as a heat transfer means for picking up heat from (and thereby cooling) the material exiting from the hopper. The material exiting from the hopper then comprises the crystallized and polymerized product of the over-all system.

In the meantime, the heat transfer liquid delivered to the cooler exit from the cooler at a substantially increased temperature. This heat transfer liquid is then recirculated directly to the crystallizer, possibly with additional heat input along the way, for heating of the amorphous polymer material being introduced for crystallization. Thus, this heat transfer liquid recirculates in a closed loop continuously supplying heat for crystallization and continuously absorbing heat from polymerized product to achieve cooling of that product.

DETAILED DESCRIPTION OF THE PREFERRED EMBODIMENT

Figure 1:
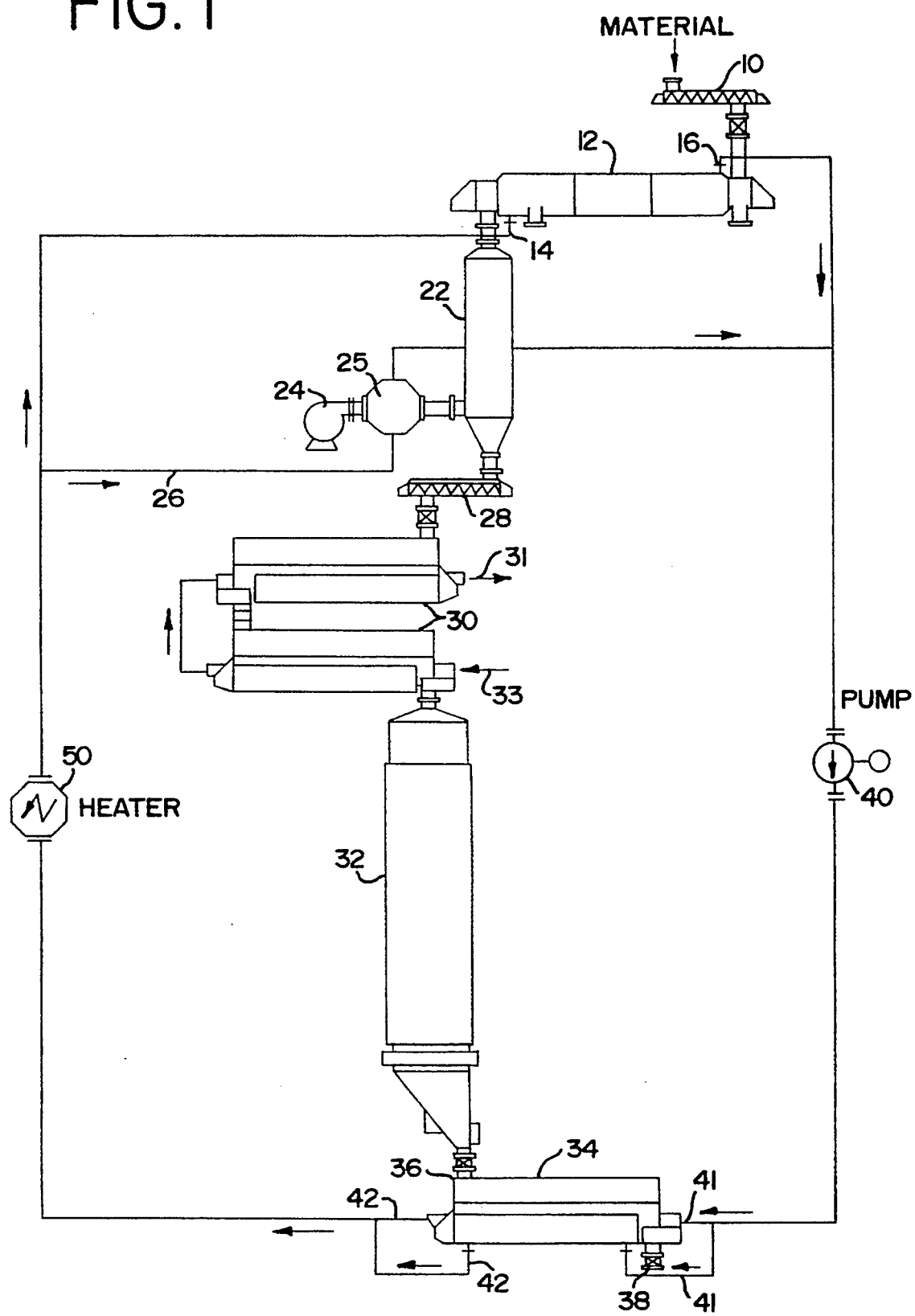
FIG. 1 is a schematic illustration of a system characterized by the features of this invention utilizing indirect heat supply means in a crystallizer and indirect heat transfer means in a cooler; and, FIG. 2 is a schematic illustration of a system in accordance with this invention wherein a fluid bed equipped with an indirect heat supply is used for a crystallizer and a fluid bed with indirect heat transfer means is used for the cooler.

The embodiment of the invention shown in FIG. 1 comprises a screw conveyor 10 for receiving cold amorphous polymer material and for delivering the material to crystallizer 12. The crystallizer comprises, for example, a heat transfer unit of the type manufactured by Hosokawa Bepex Corporation under the trademark SOLIDAIRE ®. In such a unit, the polymer is engaged with paddles mounted on a rotating rotor for agitation of the polymer while the polymer is being moved from the input end to the output end of the crystallizer.

The SOLIDAIRE ® unit includes a cylindrical housing with a heat transfer jacket for receiving heating media such as steam or oil. Heating media is introduced in the embodiment shown at inlet area 14 and exits from outlet 16 whereby the fluid moves countercurrent to the polymer material.

In the embodiment illustrated, a hopper/dryer 22 receives the crystallized material from the output end of the crystallizer 12. In conventional fashion, air, nitrogen, or other gases are introduced to the hopper/dryer by means of blower 24 and the hot heat transfer liquid may be introduced through line 26 for heating of the air in the heater 25 prior to entry into the hopper/dryer.

A second conveyor 28 is positioned at the outlet of the hopper/dryer for movement of material to preheaters 30. These units preferably comprise TORUS- DISC ® or THERMASCREW ® units of the type manufactured by Hosokawa Bepex Corporation. Such units serve to further heat the crystallized material while agitating the material to achieve uniformity. As a consideration of literature illustrating the nature of these products will reveal, inlet 31 and outlet 33 are provided so that fluid such as hot oil is adapted to be circulated through the units for the heating of heat transfer surfaces, and the crystallized material is brought into contact with these surfaces while progressing through the units.

Material is delivered from the agitator and heating units 30 to hopper/reactor 32 where the solid phase polymerization takes place in a conventional fashion. Material exiting from the hopper/reactor is then delivered to cooler 34. This cooler also constitutes a conventional unit such as a TORUSDISC ® wherein the polymerized material is cooled prior to discharging. As explained, a TORUSDISC ® unit or the like receives cool liquids which circulate adjacent heat transfer surfaces defined by a jacketed housing and a heat transfer rotor. The hot polymerized material is brought into contact with these surfaces through agitator means in the course of the material movement from the inlet end 36 of the cooler to the discharge end 38.

In accordance with the concepts of the invention, the circulating heat transfer liquid exiting from the crystallizer 12 is delivered by means of pump 40 through lines 41 to a point adjacent the outlet 38 of the cooler for passage into the jacketed housing and rotor. This liquid then circulates countercurrent to the hot polymerized material, and the liquid is then discharged from the cooler jacketed housing and rotor at 42. In accordance with the operation of the TORUSDISC ® or comparable cooler apparatus, the heat transfer liquid will pick up heat from the hot polymerized material thereby cooling the material.

The output of the heat transfer liquid from the cooler will, of course, be hotter than the input. This liquid is then delivered, at least in part, back to the crystallizer 12. A heater, for example an electric coil heater 50, may be utilized for the process temperature control by means of adding additional heat values to the heat transfer liquid. This heater may only be necessary during start-up operations since there may be sufficient heat values for achieving the purposes of the invention without use of this supplemental heat input once the operation has commenced.

Figure 2:
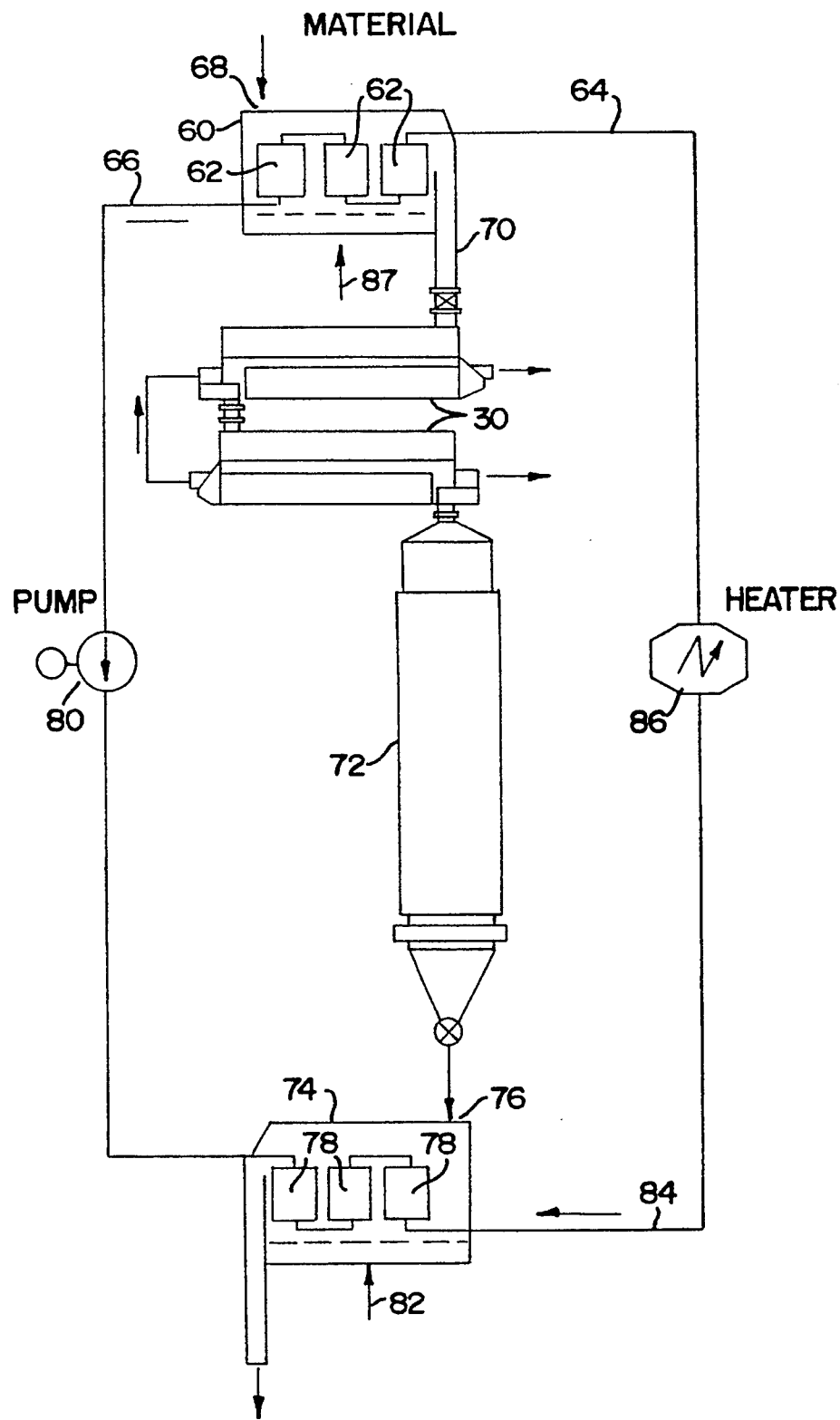

The form of the invention illustrated in FIG. 2 includes a fluid bed unit 60 which is employed for receiving the cold amorphous polymer. The fluid bed unit is preferably of the type manufactured by Hosokawa Bepex Corporation wherein indirect heating elements 62 are installed. Such elements comprise tube bundles or plate coils which are adapted for receiving heat transfer media such as hot oil through line 64 and for discharging the fluid through line 66. Air or other gas 87 is introduced into the unit 60 for achieving fluidization of the polymer and this results in agitation and progression of the polymer through the unit from the entry end 68 to the discharge end 70. The polymer thus moves countercurrent to the flow of hot heat transfer media moving through the indirect heating elements. The agitation achieved by the fluidizing operation insures heat transfer between the indirect heating elements and the polymer product whereby the product will be heated to the desired temperature for crystallization.

As with the previously described system, agitator and preheat units such as TORUSDISC ® or THERMASCREW ® units 30 are employed for bringing the crystallized material to a uniform elevated temperature prior to introduction into hopper/reactor 72. The output of the hopper/reactor is then introduced to fluid bed cooler 74 at input 76. In the cooler 74, there are installed indirect heat exchange units 78 whereby the fluidized bed of polymerized product can be efficiently cooled. As shown, the input for the indirect heating units is delivered through pump 80 from line 66 whereby the cooled recirculating heat transfer liquid from the crystallizer can be employed as a means for achieving cooling action. There is also a cooling effect brought about by the introduction of the fluidizing gas as shown at 82.

The heat transfer liquid circulating through heat exchange units 78 will issue as hot fluid into line 84. This line connects with input line 64 for the crystallizer 60 whereby a closed loop arrangement is achieved. Supplemental heating of this fluid may be achieved using heating unit 86 particularly during start up of the system or for the process temperature control purposes.

There are particular advantages achieved when utilizing the fluid bed system of FIG. 2. Specifically, the use of the indirect heat transfer units 78 significantly reduces the size of the heat exchange units and, accordingly, the gas flow rate when compared with fluid bed heating and cooling without such units. In addition, very high heat input loads are provided due to the combination of a high heat transfer coefficient, the logarithmic mean temperature difference (LMTD), and the heat transfer surface density which characterizes the fluid bed units of the type contemplated. Finally, since the heat source as well as the sink for cooling is uncoupled from the fluidizing gas source, the operating chamber dimensions and dust control equipment can be much smaller than normally utilized.

On a theoretical basis, the amount of heat that can be recovered in a solid phase polymerization operation, in this example polyethylene terephthalate, is in accordance with the following formula:

$$\text{Heat recovery} = 2000 \; lbs \times 0.4 \; Btu/lb \; °F.$$
$$(420 - 150)°F = 216,000 \; BTU \text{ per ton}$$

This amounts to $1.70 per ton at a thermal energy cost of $8/10^6 BTU.

Along with these reduced energy requirements, the closed loop heat recovery system of the invention can reduce the capital cost for heat supply units such as boilers and oil heaters and cooling/refrigeration units such as water cooling towers.

Furthermore, independent heat input to the polymer in the hopper/dryer and preheat units 30 is recovered by the closed loop liquids in the cooler which insures heating of the liquids passed to the crystallizer to at least near the temperatures needed for that operation. Accordingly, the need for equipment alteration or for other significant heat input is diminished if not eliminated.

In a typical example of the operation of the invention, cold amorphous polyethylene terephthalate granules are introduced to a crystallizer at temperatures of about 20°-50° F. The temperature of the granules is raised to 320°-360° F. for crystallization, and the additional heat added in the hopper/dryer or during agitation and preheat in units 30 will raise the temperature to between about 410° and 430° F. The crystallized granulate is then discharged from the polymerization reactor at temperatures of 420° to 450° F. and then cooled in the cooler to about 150° F.

Variations from this example will be apparent to those of skill in the art. It will also be understood that other changes and modifications may be made without departing from the spirit of the invention particularly as defined in the following claims.

I claim:

1. In a process for the solid phase polymerization of polymers wherein cold amorphous polymer is introduced to a crystallizer at temperatures in the order of 20°–50° F. and heated to temperatures in the order of 320°–360° F. to crystallize the polymer, the crystallized polymer is discharged from the crystallizer to a reactor for heating to temperatures in the order of 420°–450° F. to achieve solid phase polymerization, and the polymer is then discharged from said reactor to a cooler for cooling to a temperature of about 150° F., each including indirect heat exchange means defining internal fluid passages, the improvement wherein said indirect heat exchange means include internal fluid passages, introducing cold fluids to the internal fluid passages of said cooler and cooling said polymer through indirect heat exchange with said cold fluids, discharging the fluids from said internal fluid passages of said cooler after said indirect heat exchange in said cooler, and recirculating the fluids from the cooler to the internal fluid passages of said crystallizer whereby said fluids from said cooler comprise at least a portion of said hot fluids introduced to said crystallizer, and discharging the fluids from said internal fluid passages of said crystallizer after said indirect heat exchange in said crystallizer, and recirculating the fluids from the crystallizer to the internal fluid passages of said cooler whereby said fluids from said crystallizer comprise at least a portion of said cold fluids introduced to said cooler.

2. A process according to claim 1 including the step of continuously pumping said fluids through lines interconnecting the internal fluid passages of said crystallizer heat exchange means with the internal fluid passages of the cooler heat exchange means.

3. A process according to claim 2 wherein said crystallizer comprises a fluid bed, disposing said indirect heat exchange means within said bed, and including the step of passing said hot fluids through said indirect heat exchange means while said polymer is subject to the fluidizing action of the bed.

4. A process according to either of claims 2 or 3 wherein said cooler comprises a fluid bed, disposing indirect heat exchange means within said bed, and including the step of passing said cold fluids through said indirect heat exchange means while said polymer is subject to the fluidizing action of the bed.

5. A process according to claim 1 including an agitator/preheater means interposed between said crystallizer and reactor, and including the step of adding heat to said polymer in said agitator/preheater to raise the temperature thereof to in the order of 410°–430° F. while agitating the polymer to prepare the polymer for the polymerization reaction.

6. In an apparatus for the solid phase polymerization of polymers comprising a crystallizer, means for introducing cold amorphous polymer material into said crystallizer, indirect heat exchange means located within said crystallizer, means for delivering hot fluids to said heat exchange means for achieving crystallization of said polymer, a reactor, means for delivering crystallized polymer to said reactor for achieving solid phase polymerization of the polymer, a cooler, means for discharging said polymer from said reactor into said cooler, indirect heat exchange means located within said cooler, and means for delivering cold fluids to said heat exchange means in said cooler, the improvement wherein said indirect heat exchange means include internal fluid passages, a first fluid transmission line connecting the internal passages of said heat exchange means in said crystallizer to the internal passages of said heat exchange means in said cooler, means for delivering fluids exiting from said heat exchange means in said crystallizer to said first fluid transmission line whereby said fluids are transmitted through said first transmission line to provide said cold fluids to said heat exchange means in said cooler, a second fluid transmission line connecting the internal passages of said heat exchange means in said cooler to the internal passages of said heat exchange means in said crystallizer, and means for delivering fluids exiting from said heat exchange means in said cooler to said second fluid transmission line whereby said fluids are transmitted through said second fluid transmission line to provide said hot fluids to said heat exchange means in said crystallizer.

7. An apparatus according to claim 6 including a pump in at least one of said transmission lines for continuously pumping said fluids through the respective internal fluid passages.

8. An apparatus according to claim 7 wherein said crystallizer comprises a fluid bed, and means for passing said hot fluids through said indirect heat exchange means mounted in said crystallizer while said polymer is subject to the fluidizing action of the bed.

9. An apparatus according to either of claims 7 or 8 wherein said cooler comprises a fluid bed, and means for passing said cold fluids through said indirect heat exchange means mounted in said cooler while said polymer is subject to the fluidizing action of the bed.

10. An apparatus according to claim 6 including an agitator/preheater means interposed between said crystallizer and reactor, and means for adding heat to said polymer in said agitator/preheater while agitating the polymer to prepare the polymer for the polymerization reaction.

* * * * *